US012715010B2

(12) United States Patent
Muraoka

(10) Patent No.: US 12,715,010 B2
(45) Date of Patent: Aug. 25, 2026

(54) SHOWER SYSTEM

(71) Applicant: Kohler Co., Kohler, WI (US)

(72) Inventor: Hiroyuki Chanseol Muraoka, Milwaukee, WI (US)

(73) Assignee: Kohler Co., Kohler, WI (US)

( * ) Notice: Subject to any disclaimer, the term of this patent is extended or adjusted under 35 U.S.C. 154(b) by 932 days.

(21) Appl. No.: 17/946,480

(22) Filed: Sep. 16, 2022

(65) Prior Publication Data

US 2023/0102814 A1 Mar. 30, 2023

Related U.S. Application Data

(60) Provisional application No. 63/245,606, filed on Sep. 17, 2021.

(51) Int. Cl.

| | |
|---|---|
| ***B05B 1/26*** | (2006.01) |
| ***B05B 1/18*** | (2006.01) |
| ***E03C 1/04*** | (2006.01) |
| ***F21V 33/00*** | (2006.01) |
| ***H04R 1/02*** | (2006.01) |

(52) U.S. Cl.

CPC ................ *B05B 1/267* (2013.01); *B05B 1/18* (2013.01); *E03C 1/0405* (2013.01); *E03C 1/0408* (2013.01); *F21V 33/004* (2013.01); *H04R 1/028* (2013.01)

(58) Field of Classification Search

CPC ........... B05B 1/169; B05B 1/18; B05B 1/185; B05B 1/26; B05B 1/262; B05B 1/265; B05B 1/267; B05B 15/00; B05B 1/182; B05B 1/1821; B05B 1/1822; B05B 1/1823; B05B 1/192; E03C 1/0405; E03C 1/0408; F21V 33/004; H04R 1/028

See application file for complete search history.

(56) References Cited

U.S. PATENT DOCUMENTS

| | | | |
|---|---|---|---|
| 3,739,983 | A | 6/1973 | Jousson |
| 3,847,159 | A | 11/1974 | Hofer |
| 3,858,252 | A | 1/1975 | Ejchorszt |
| 4,084,271 | A | 4/1978 | Ginsberg |
| 4,337,899 | A | 7/1982 | Selberg |
| 5,137,214 | A | 8/1992 | Mallery |
| 5,142,713 | A | 9/1992 | Makool |
| 5,297,739 | A | 3/1994 | Allen |
| 6,322,008 | B1 | 11/2001 | Aker et al. |
| 7,278,591 | B2 | 10/2007 | Clearman et al. |
| 7,437,780 | B2 | 10/2008 | Lin |
| 7,611,072 | B2 | 11/2009 | Peters et al. |
| 8,016,215 | B1 | 9/2011 | Zhadanov et al. |
| 8,458,826 | B2 | 6/2013 | Mock et al. |
| 8,733,675 | B2 | 5/2014 | Leber |

(Continued)

FOREIGN PATENT DOCUMENTS

| | | | | |
|---|---|---|---|---|
| WO | WO-98/14104 A1 | | 4/1998 | |
| WO | WO-00/49987 A1 | | 8/2000 | |
| WO | WO-2020033886 A1 | * | 2/2020 | ............... A47K 3/28 |

*Primary Examiner* — Darren W Gorman

(74) *Attorney, Agent, or Firm* — Foley & Lardner LLP

(57) ABSTRACT

A shower system includes a nozzle that can dispense a stream of water through airspace in a first direction. The shower system includes a flow redirector that can receive the stream of water from the nozzle through the airspace and rebound the stream of water to redirect the stream of water in a second direction different from the first direction.

10 Claims, 18 Drawing Sheets

(56) References Cited

U.S. PATENT DOCUMENTS

| | | | | |
|---|---|---|---|---|
| 9,303,394 | B2 | 4/2016 | Mock et al. | |
| 9,326,484 | B2 | 5/2016 | Allen | |
| 9,623,423 | B2 | 4/2017 | Erickson | |
| 10,265,711 | B2 | 4/2019 | Erickson | |
| 10,478,836 | B2 | 11/2019 | Gao et al. | |
| 10,820,757 | B2 | 11/2020 | Chung | |
| 10,843,208 | B2 * | 11/2020 | Hatton | B05B 1/04 |
| 10,987,680 | B2 | 4/2021 | Mazz et al. | |
| 11,097,289 | B2 | 8/2021 | Kajuch et al. | |
| 2011/0089259 | A1 * | 4/2011 | Paget | B05B 1/18<br>239/289 |
| 2016/0287471 | A1 | 10/2016 | Urfig | |
| 2017/0189919 | A1 | 7/2017 | Mei | |
| 2018/0290155 | A1 * | 10/2018 | Chung | B05B 1/185 |
| 2019/0151866 | A1 | 5/2019 | Lu et al. | |
| 2020/0086336 | A1 | 3/2020 | Rosko et al. | |
| 2020/0181894 | A1 * | 6/2020 | Chung | A47K 3/281 |
| 2021/0153697 | A1 | 5/2021 | Chung | |
| 2021/0237101 | A1 | 8/2021 | Mazz et al. | |
| 2021/0340745 | A1 * | 11/2021 | Wilcox | B05B 1/1672 |
| 2022/0176390 | A1 * | 6/2022 | Schulte | B05B 15/65 |

* cited by examiner

SHOWER SYSTEM

CROSS-REFERENCE TO RELATED PATENT APPLICATIONS

This application claims the benefit of and priority to U.S. Provisional Patent Application 63/245,606, filed Sep. 17, 2021, incorporated herein by reference in its entirety.

BACKGROUND

The present disclosure relates generally to showers, shower enclosures, and shower assemblies for bathing. More specifically, the present disclosure relates to shower assemblies including lights and speakers for playing music.

SUMMARY

At least one embodiment relates to a shower system. The shower system includes a nozzle that can dispense a stream of water through airspace in a first direction. The shower system includes a flow redirector that can receive the stream of water from the nozzle through the airspace and rebound the stream of water to redirect the stream of water in a second direction different from the first direction.

Another embodiment relates to a shower system. The shower system includes a movable nozzle that can dispense a stream of water into airspace. The shower system includes a flow redirector that can receive the stream of water from the movable nozzle through the airspace and redirect at least a portion of the stream of water that is incident upon the flow redirector. The shower system includes a controller that can direct the movable nozzle to dispense the stream of water in a direction towards the flow redirector.

Another embodiment relates to a shower system. The shower system includes a nozzle that can dispense a stream of water into airspace. The shower system includes a movable flow redirector that can receive the stream of water from the nozzle through the airspace and redirect the stream of water. The shower system includes a controller that can adjust the movable flow redirector to change a direction in which the movable flow redirector redirects the stream of water.

Another embodiment relates to a shower system. The shower system includes a showerhead having a plurality of nozzles, at least one flow redirector, and an entertainment system. The entertainment system, operated by a controller, includes a light panel, speaker system, and a plurality of positioning devices associated with the nozzles. The positioning devices can direct the configuration of the nozzles such that they may point at the least one flow redirector. The at least one flow redirector can change the direction of an incoming water flow.

Another embodiment relates to a system for changing the configuration of water flowing from a showerhead. The system includes a plurality of nozzles, a plurality of positioning devices associated with the nozzles, and a controller, including a processor and a memory, operably coupled to the positioning devices. Wherein, the memory stores instructions, that when executed by the processor, cause the controller to send signals to the plurality of positioning devices such they configure the plurality of nozzles in a pattern.

Another embodiment relates to a system for synchronizing a showering experience. The system includes a showerhead and an entertainment system, operated by a controller. The controller can synchronize operation of the entertainment system and the showerhead by analyzing characteristics of the media produced by a component the entertainment system and correspondingly operating the showerhead and components of the entertainment system.

This summary is illustrative only and is not intended to be in any way limiting.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
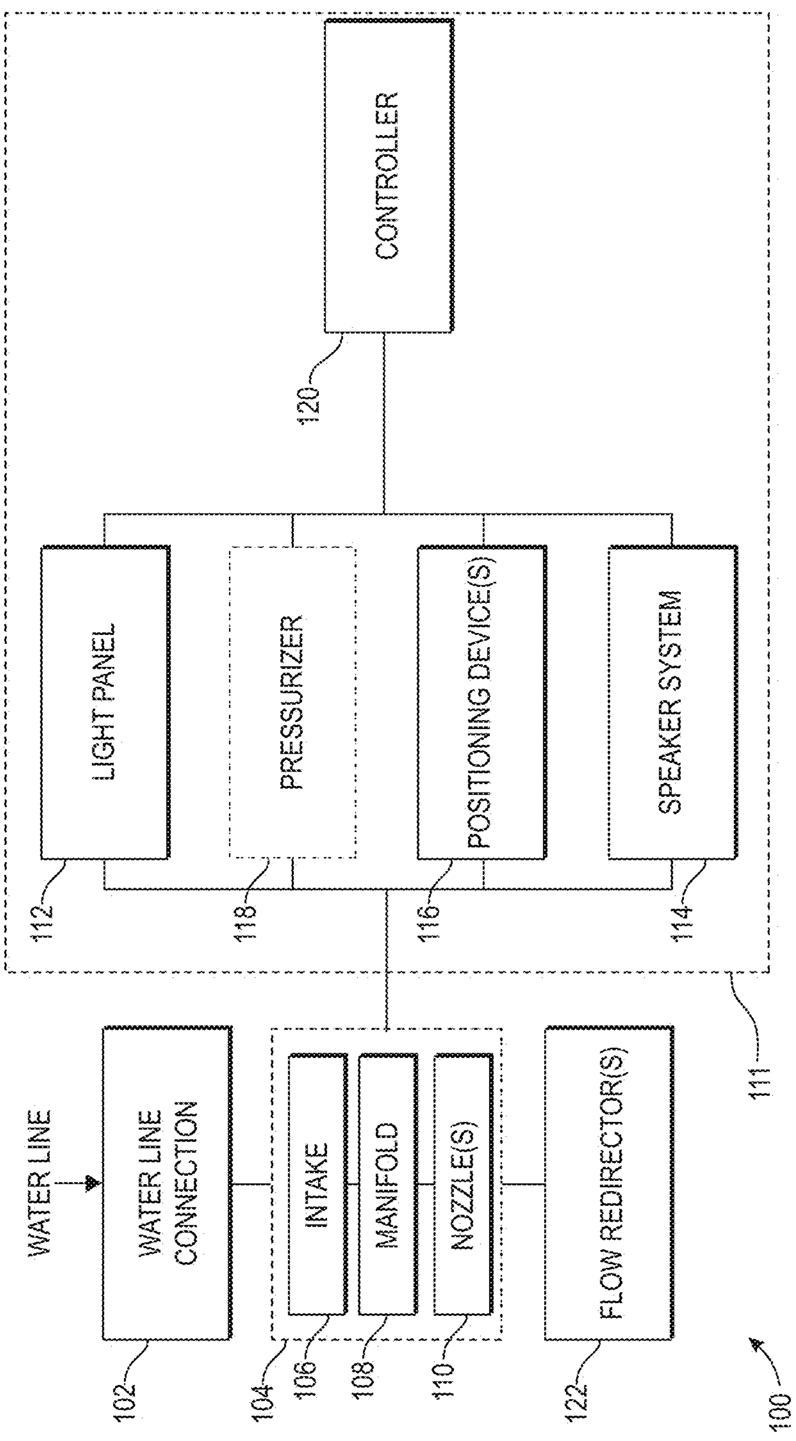
FIG. 1 is a diagram of a shower system according, according to an exemplary embodiment.

Before turning to the FIGURES, which illustrate certain exemplary embodiments in detail, it should be understood that the present disclosure is not limited to the details or methodology set forth in the description or illustrated in the FIGURES. It should also be understood that the terminology used herein is for the purpose of description only and should not be regarded as limiting. Below are more detailed descriptions of various concepts related to, and implementations of, methods, apparatuses, and assemblies for shower systems. The various concepts introduced above and discussed in greater detail below may be implemented in any of a number of ways, as described concepts are not limited to any particular manner of implementation. Examples of specific implementations and applications are provided primarily for illustrative purposes.

Generally speaking, shower systems are used to direct the flow of water and carry out a bathing experience in a bathing environment (e.g., bathroom, wet room, etc.). For applications of a shower system in a bathing environment, the shower system is often restricted by the location of water lines in the bathing environment and the cost of installing new water lines. Thus, it may be desirable to provide a shower system that may provide a comprehensive bathing experience without the installation of additional water lines.

Referring generally to the FIGURES, disclosed herein is a shower system for bathing environments (e.g., bathroom, wet room, etc.). The shower system may be used in any configuration of bathing environment (e.g., standing, sitting, lying, etc.). The shower system may include additional components (e.g., speakers, lights, etc.) that may enhance the bathing experience.

The shower system may include devices for redirecting (e.g., changing the direction of) flow from a nozzle associated with the shower system. Advantageously, in some embodiments, the shower system includes flow redirectors configured to direct water towards a user from several directions. Directing water towards a user from several directions provides the user with a thorough bathing experience. Furthermore, the shower system includes an entertainment system (e.g., speaker, lights, controller, etc.). In some embodiments, the entertainment system may control the flow of water. Controlling the flow of water by an entertainment system provides a user with a synchronized experience.

In some embodiments, the shower system includes a set of nozzles configured to dispense water in a directed stream. The shower system may include any number of nozzles located on any surface or surfaces of the shower enclosure (e.g., ceiling, front wall, rear wall, side walls, floor, etc.). In an exemplary embodiment, the shower system includes a set of nozzles located on the front wall and/or ceiling of the shower enclosure. The nozzles may be fixed or stationary nozzles (e.g., configured to dispense water in a static or constant direction) or movable or adjustable nozzles that can be reoriented manually or automatically (e.g., by a controller or actuator) to change the direction in which the directed stream of water is dispensed. The nozzles may be configured to dispense the water in a substantially focused and linear stream.

The shower system may further include a set of flow redirectors configured to receive a directed stream of water from any of the nozzles and redirect the stream of water toward a center area of the shower enclosure where a user would be located. The flow redirectors may be located on any surface or surfaces of the shower enclosure that have line of sight to any of the nozzles. The flow directors can maintain the stream of water in a substantially focused and linear stream or can cause the stream of water to diverge (e.g., spread, fan out, etc.) along one or more dimensions (e.g., horizontally, vertically, at any angle, etc.) to cover a wider area. In an exemplary embodiment, the flow redirectors are located along the left side wall and right side wall of the shower enclosure, but could be located along any surface in various other embodiments. The flow redirectors may be static flow redirectors having a fixed angle or orientation relative to the nozzles or adjustable flow redirectors that can be re manually or automatically adjusted (e.g., by a controller or actuator) to cause the redirected stream of water to change direction. In various embodiments, the flow redirectors can integrated with the tiling or wall structure of the shower enclosure (e.g., tiles having concave, parabolic, or curved geometries that act to redirect a stream of water) or can be separate devices mounted on the surfaces of the shower enclosure (e.g., a wall-mounted box or panel having one or more areas of concave, parabolic, or curved geometries that act as flow redirectors).

In operation, the nozzles may dispense directed streams of water through airspace within the shower enclosure toward the flow redirectors located on other surfaces of the shower enclosure, which redirect the streams of water toward the center area of the shower enclosure. In this way, the water streams may approach the center area of the shower enclosure from many different angles or locations (e.g., from various locations along the left side wall, right side wall, front wall, floor, ceiling, etc.) even if the nozzles are only located along one wall of the shower enclosure (e.g., the wet wall). Advantageously, this allows the shower system to replicate the performance of a shower system with many different nozzles located on different surfaces of the shower enclosure without requiring the user or installer to plumb multiple walls and install nozzles on many different surfaces. The nozzles can be static to always aim at the same flow redirectors or can be adjustable to aim at different flow redirectors, which in turn may be configured to redirect the streams of water at different angles, locations, or patterns. Similarly, the flow redirectors can be static to always redirect the streams of water at the same angles, locations, or patterns, or can be adjustable to redirect the streams of water at varying angles, locations, or patterns. A combination of static and adjustable nozzles and/or flow redirectors can be used in some embodiments. These and other features and advantages of the shower system are described in greater detail below.

FIG. 1 depicts a block diagram of a shower system 100, according to an exemplary embodiment. The shower system 100 is configured for installation in a bathing environment. Standard showering systems (e.g., those comprising a single shower head) can often only shower a user with water coming from a singular direction. Standard showering systems generally require only require connection to a single water line access location (two if coupled with bathtub faucet). In contrast, multi-headed shower systems can provide a stream of water coming from multiple locations in a bathing environment. However, multi-headed shower systems have a high installation cost, as they require multiple connections to a water line. The shower system 100 provides a system for achieving the multi-directional benefits of a multi-headed shower system 100, while having the low-cost installation benefits of a standard system.

The shower system 100 includes a water line connection 102. The water line connection 102 connects to a water line (e.g., water source in a plumbing system). The water line connection 102 may be formed of various materials suitable for carrying water (e.g., polyethylene (PEX), polyvinyl chloride (PVC), copper pipe, acrylonitrile butadiene styrene (ABS), galvanized steel, cast iron, etc.). In some embodiments, the water line connection 102 may be housed within a wall. In some embodiments, the water line connection 102 may be external to a wall. In some embodiments, the water line connection 102 includes an in-line filtration system (e.g., sediment filtration, carbon filtration, ion-exchange, ultraviolet disinfection, etc.)

The water line connection 102 fluidly couples (e.g., by a pipe) to a showerhead 104. The showerhead 104 is configured to condition (e.g., redirect, split, alter pressure, etc.) the water coming from the water line connection 102. In some embodiments, the showerhead 104 includes an in-line filtration system. The showerhead 104 couples to the water line connection 102 through the intake 106. The intake 106 is a type of fitting configured to accepts fluid (e.g., union fitting, bushing fitting, push-to-connect, threaded, sweat fitting, slip fitting, etc.). The intake 106 then fluidly couples to a manifold 108. The manifold 108 directs incoming water towards at least one nozzle 110. The manifold 108 may be configured to direct water to each nozzle 110 such that each nozzle 110 has equal water pressure. The at least one nozzle 110 is configured to control the directions and characteristics (e.g., exit velocity, spray angle, etc.) of the water flow 200. In some embodiments, the at least one nozzle 110 may be reconfigured (e.g., changing spray angle (e.g., angle formed by droplets of fluid stream when exiting nozzle), changing direction, changing exit velocity, etc.) during use. Reconfiguring during use allows for altering the showering experience during use to match user preference. In some embodiments, each nozzle 110 may be configured differently (e.g., different direction and/or different characteristics). In some embodiments, the nozzle 110 may include a valve (e.g., ball valve, solenoid valve, etc.) configured to open and close each nozzle 110. The nozzle 110 can dispense a stream of water from the manifold 108 into a portion of the shower system 100 (e.g., into airspace of an enclosure).

The shower system 100 include an entertainment system 111. The showerhead 104 is coupled to an entertainment system 111. In some embodiments, the entertainment system 111 may be fully housed within the showerhead 104. The entertainment system 111 is configured to provide a user with an auditory, visual, and sensory experience during showering. In some embodiments, the shower system 100 does not include an entertainment system 111.

The entertainment system 111 includes a light panel 112. The light panel 112 is a screen (e.g., LED, LCD, OLED, etc.) configured to display still images or video. In some embodiments, the light panel 112 further functions as a lighting system (e.g., overhead light, fill light, etc.).

The entertainment system 111 includes a speaker system 114. The speaker system 114 may more than one electroacoustic transducer device (e.g., speaker) configured for different frequencies. For example, the speaker system 114 may include a speaker configured for delivering high frequency (up to 100 kHz) audio, a speaker configured for delivering mid-range (250 Hz-2000 Hz) audio, and a speaker configured for delivering low range (20 Hz-200 Hz) audio.

The entertainment system 111 includes at least one positioning device 116. Each positioning device 116 is associated with a nozzle 110. The at least one positioning device 116 is configured to alter the direction in which the nozzle 110 redirects flow of water. In some embodiments, the positioning device 116 may be configured to alter the nozzle 110 characteristics (e.g., change the spray angle, etc.) In some embodiments, the at least one positioning device 116 may include valves configured to open and close the nozzle 110 associated with a positioning device 116.

In some embodiments, the entertainment system 111 includes a pressurizer 118. The pressurizer 118 alters the pressure of the water in the showerhead 104. For example, if water pressure is too low, the pressurizer 118 may increase the pressure of the water. The water pressure may also be adjusted by a user according to preference. In some embodiments, the pressurizer 118 is included as part of the showerhead 104. In some embodiments, the pressurizer 118 pressurizes to a set pressure and cannot be reconfigured.

The entertainment system 111 is managed (e.g., functions are controlled) by a controller 120. The controller 120 is a computer system (e.g., includes at least a processor and a memory) configured to communicatively couple (e.g., wirelessly, wired, etc.) to the other components of the entertainment system 111. The controller 120 may be connected to a power grid (e.g., through an outlet, direct, etc.). In some embodiments, the controller 120 may be powered by a battery (e.g., Li—Po, Li-Ion, etc.).

The controller 120 is configured to control the functionality of the other components of the entertainment system 111 by sending signals (e.g., electrical current, electromagnetic wave, etc.). In some embodiments, the controller 120 is a mechanical system, or may include both electrical components and mechanical components. The controller 120 may be housed such that it can remain in electric communication with the components of the entertainment system 111. For example, the controller 120 may be housed in the showerhead 104, may be mounted on the wall of a shower, may be housed within a wall, or may be anywhere within a bathroom. A user may input commands into the controller 120 physically (e.g., buttons, touchscreen, etc.) or wirelessly (e.g., through a mobile device coupled to the controller 120), when the controller 120 includes wireless capabilities (e.g., Wi-Fi, Bluetooth, etc.). In some embodiments, the controller 120 may include a dedicated remote to control functionalities. In some embodiments, the controller 120 may include voice control. In some embodiments, the controller 120 automatically follows predetermined instructions. In some embodiments, the controller 120 may be externally controlled.

The controller 120 communicatively couples to the light panel 112. The controller 120 sends signals to the light panel 112 to dictate what is displayed on the light panel 112. For example, the controller 120 may send the light panel 112 a signal to display a color (e.g., blue, green, purple, etc.). The light panel 112 will then display the corresponding color.

The controller 120 communicatively couples to the speaker system 114. The controller 120 sends signals to the speaker system 114 to dictate what is played (e.g., what audio is produced) by the speaker system 114. In some embodiments, the controller 120 may be connected to a database. A user may choose content from the database to play on the speaker system 114.

The controller 120 communicatively couples to the at least one positioning device 116. The controller 120 sends signals to the at least one positioning device 116. Responsive to the received signal, each positioning device 116 reconfigures a corresponding nozzle 110. In some embodiments, each positioning device 116 is connected to the controller 120 separately and receives signals independently. In some embodiments, the controller 120 may be preloaded with a set number (e.g., 1, 2, 3, 4, 5, etc.) of configurations for the at least one positioning device 116. For example, the user may select a configuration from a selection comprising a first configuration, a second configuration, and a third configuration.

The controller 120 communicatively couples to the pressurizer 118. The controller 120 sends signals to the pressurizer 118. The pressurizer 118 then, upon receiving the signals, adjusts the water pressure. In some embodiments, the controller 120 may automatically send the signals to the pressurizer 118 to maintain water pressure. In some embodiments, where the pressurizer 118 is independent of the entertainment system 111, the pressurizer 118 may include its own controller 120.

The controller 120 may operate each component of the entertainment system 111 independently. In some embodiment, each component of the entertainment system 111 includes its own controller 120. The controller 120 may also operate each component of the entertainment system 111 together. In some embodiments, the functionality of each component of the entertainment system 111 is synced together by the controller 120. For example, the colors displayed by the light panel 112 and the configuration of the positioning devices 116 may change responsive to characteristics (e.g., tempo, pitch, volume, etc.) of the audio played by the speaker system 114. The controller 120 may also facilitate intercommunication between the components of the entertainment system 111.

The shower system 100 further includes at least one flow redirector 122. Each flow redirector 122 is configured to alter at least one attribute (e.g., direction, spray angle, etc.) of the water flow 200 leaving a nozzle 110. The flow redirector 122 alters the water flow 200 by receiving and rebounding the incoming water flow 200 from the nozzle 110 and redirecting it to a different direction. The flow redirector 122 may have various configurations, each configuration changing the attributes of the water flow 200 differently. In some embodiments, a configuration of the flow redirector 122 may include more than one section, each section configured to alter the water flow 200 differently. The flow redirector 122 may be formed of a material capable of being formed into a shape and that can withstand repeated contact with pressurized water (e.g., ceramic, composite, epoxy, etc.). In some embodiments, the flow redirector 122 may have a coating (e.g., silicon, polymer, etc.) intended to reduce friction between the flow redirector 122 and the incoming water flow 200. Each flow redirector 122 is mounted in a bathing environment to provide the user with a varied (e.g., water coming from different directions) bathing experience.

Figure 2:
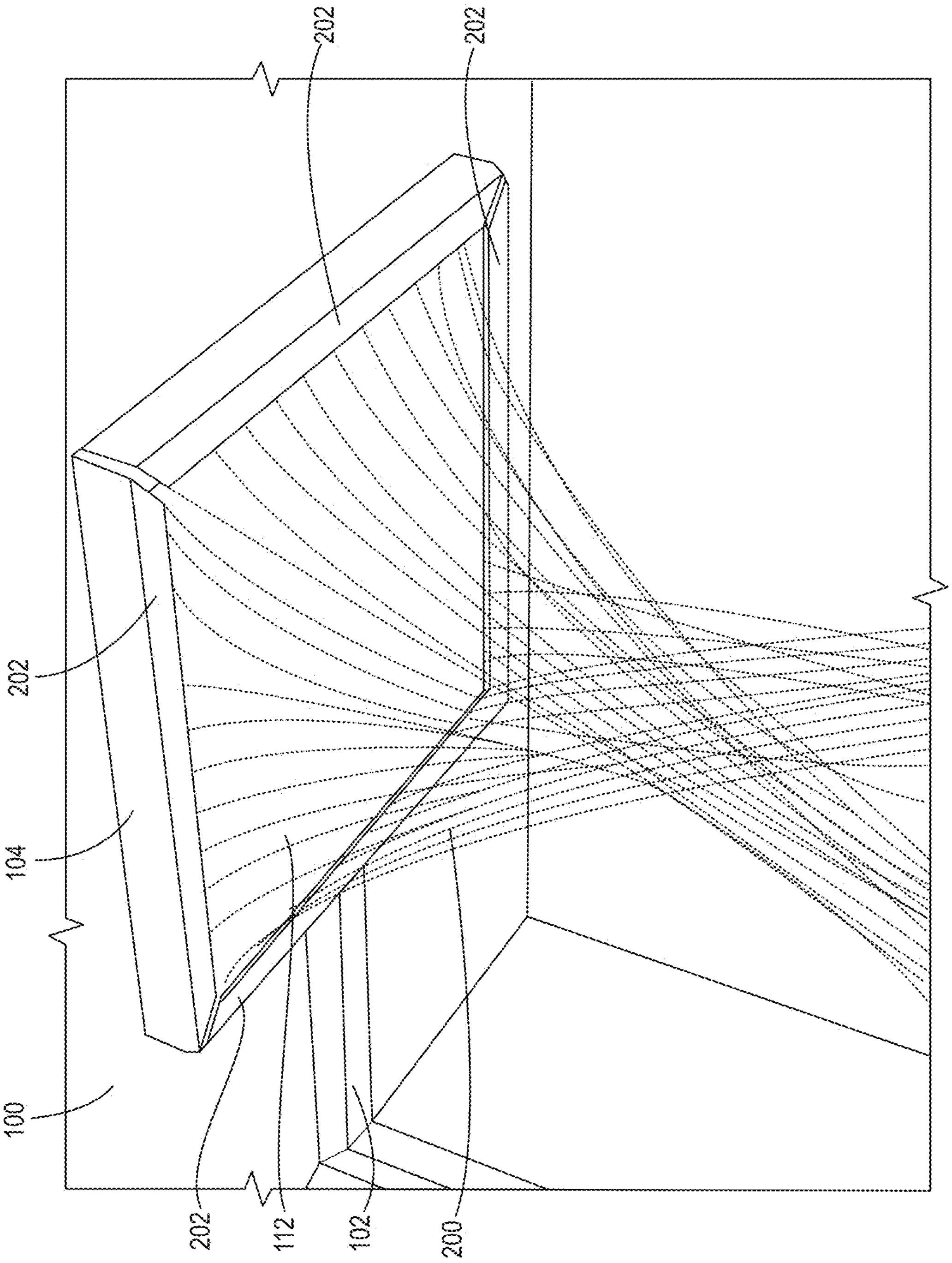
FIG. 2 is a perspective view of a showerhead, according to an exemplary embodiment.

FIG. 2 depicts a perspective view of a shower system 100, according to an exemplary embodiment. A showerhead 104 is coupled to a water line connection 102. The showerhead 104 is configured to direct water flow 200 in patterns. The water flow 200 exits the showerhead 104 through the nozzles 110 within nozzle assemblies 202. The nozzle assemblies 202 include a plurality of nozzles 110 all arranged in line with each other. Each nozzle assembly 202 is configured identically (e.g., having same nozzle 110 configurations) to the other nozzle assemblies 202, thus providing a uniform symmetric water flow 200. In some embodiments, the nozzle assemblies 202 may be configured individually. The showerhead 104 further includes a light panel 112 centered in the showerhead 104. The four nozzle assemblies 202 border the light panel 112.

FIGS. 3A-3D depict various configurations of water flow 200 from a showerhead 104 from FIG. 2, according to example embodiments. Each showerhead 104 is mounted on a ceiling of a bathing environment. The configurations provide a user with different showering experiences by altering the characteristics (e.g., direction, spray angle, etc.) of the water flow 200. In some embodiments, forming the configurations requires the water flow 200 to be at a certain pressure.

Figures 3A, 3B, 3C, 3D:
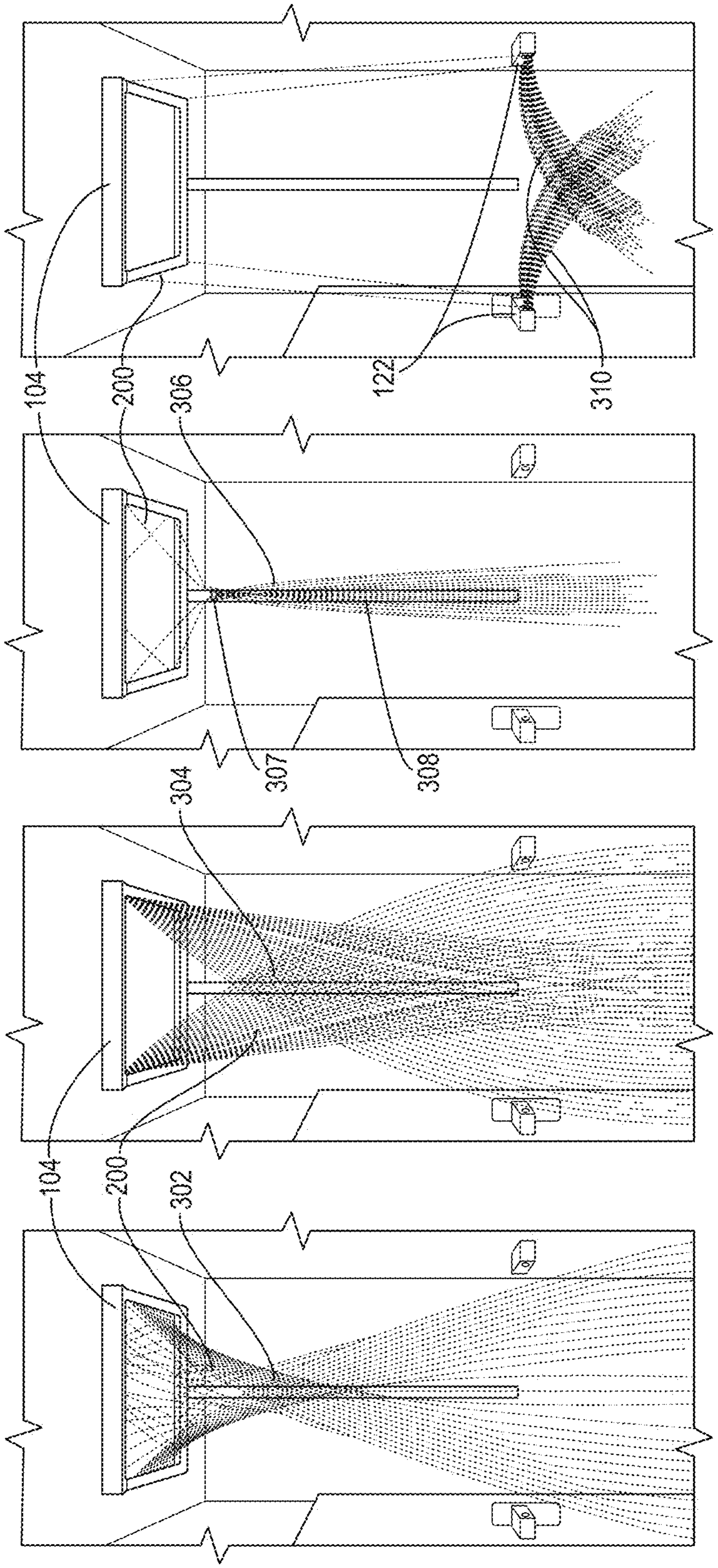
FIG. 3A-D are front views of various configurations of the showerhead of FIG. 2, according to exemplary embodiments.

FIG. 3A depicts the water flow 200 exiting the showerhead 104 and forming a first pattern 302. The first pattern 302 is formed by configuring the nozzle assemblies 202 of the showerhead 104 to direct water flow 200 down (e.g., away from the showerhead 104) and towards the center of the showerhead 104. Additionally, the nozzle assemblies 202 are configured to direct the water flow 200 at an angle vertically. The nozzles 110 are configured to provide a smooth (e.g., laminar) water flow 200. The resulting first pattern 302 is a helical pattern.

FIG. 3B depicts the water flow 200 exiting the showerhead 104 and forming a second pattern 304. The second pattern 304 is formed by configuring the nozzle assemblies 202 of the showerhead 104 to direct water flow 200 down and towards the center of the showerhead 104. To form the second pattern 304, two nozzle assemblies 202 are configured to block (e.g., by means of a valve) flow to the nozzles 110. The two nozzle assemblies 202 are located on opposite sides of the showerhead 104. Additionally, the nozzles 110 of the active (e.g., water flow 200 flowing out of) nozzle assemblies 202 are configured such that they have a spray angle that breaks up the water flow 200. The resulting second pattern 304 is a rain-like (e.g., imitates rainfall) pattern. In some embodiments, all nozzle assemblies 202 may be activated.

FIG. 3C depicts the water flow 200 exiting the showerhead 104 and forming a third pattern 306. The third pattern 306 is formed by configuring the nozzle assemblies 202 of the showerhead 104 to direct water flow 200, only from nozzles 110 located at the corners of the showerhead 104, to a central point 307. After reaching the central point 307, the water flow 200 comes together and continues down in a unified flow 308. The resulting third pattern 306 is four streams that come together to form a single unified flow 308, which may have a spray angle. In some embodiments, the third pattern 306 may be formed with more nozzles 110 active than just the corner nozzles 110.

FIG. 3D depicts the water flow 200 exiting the showerhead 104 and redirecting off flow redirectors 122. The flow redirectors 122 are mounted on the walls of a bathing environment. The flow redirectors 122 redirect the water flow 200 resulting in a redirected flow 310. In some embodiments, the flow redirectors 122 may be reconfigured to produce redirected flow 310 having different characteristics (e.g., direction, spray angle, etc.).

Referring generally to FIGS. 4-9, various configurations of a flow redirector 122 are shown. Having various configurations of the flow redirector 122 allows for configuring a shower system 100 in various configurations, according to a user preference or a user need. For example, a shower system 100 may be configured such that a user is bathed with water flowing from above, behind, and in front of the user. These configurations are exemplary only and other configurations of flow redirectors 122 may be used.

Figure 4:
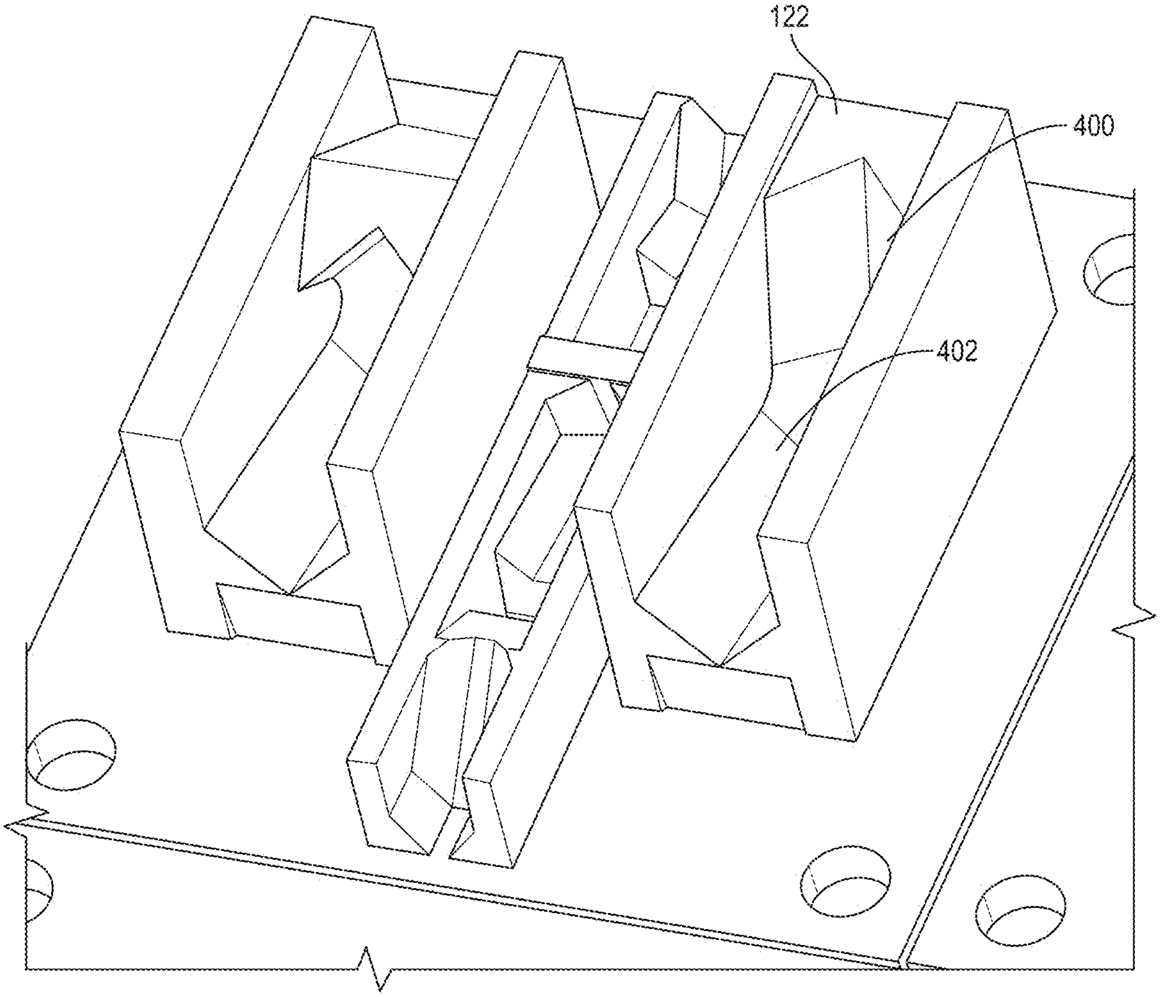
FIG. 4 is a flow redirector, according to an exemplary embodiment.

FIG. 4 depicts a flow redirector 122 in a first redirector configuration 400, according to a particular embodiment. The first redirector configuration 400 redirects incoming water flow 200 along a first internal channel 402. The first internal channel 402 directs the incoming water flow away from the source of the incoming water flow 200. As depicted in FIG. 4, the first internal channel 402 can be at least partially angled (e.g., arcuate, bent, etc.).

Figure 5:
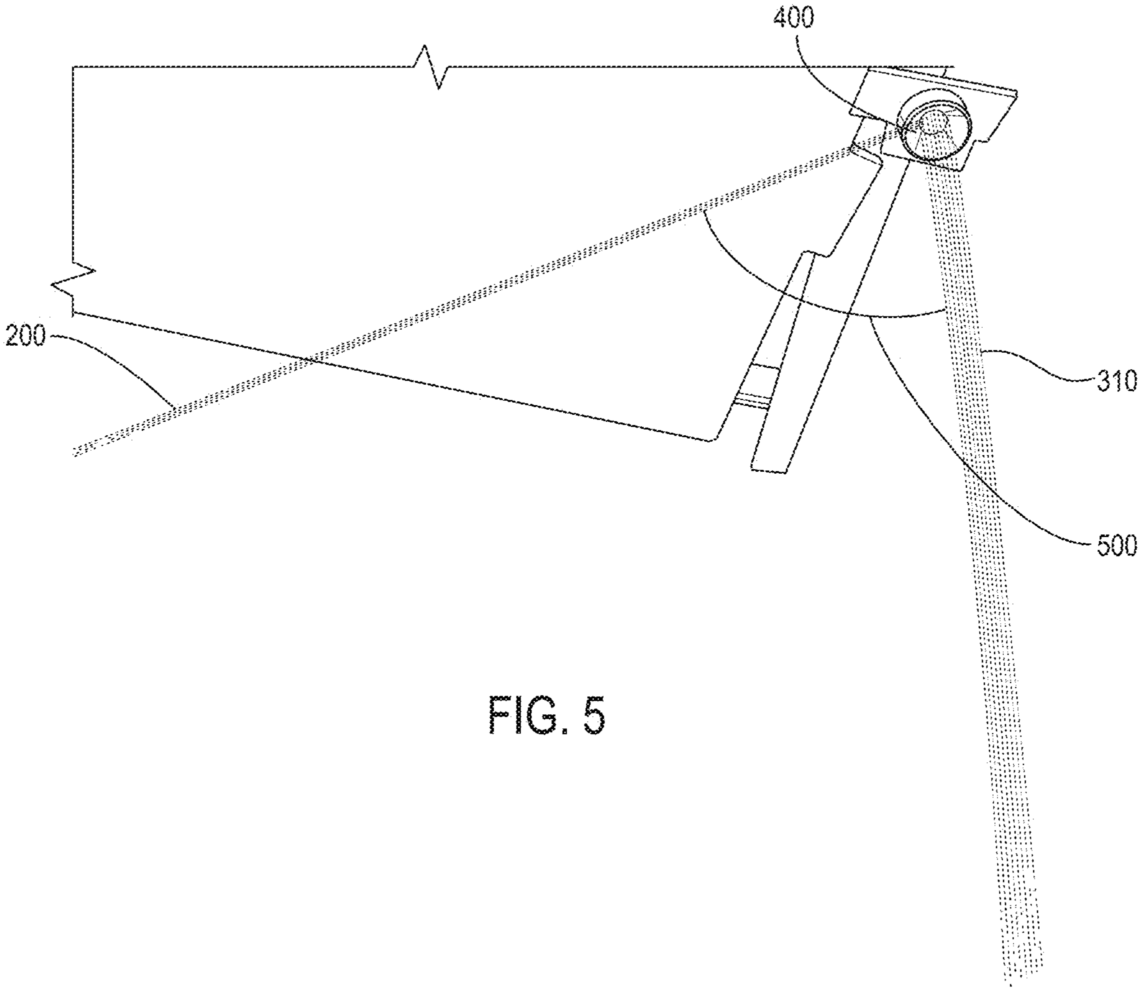
FIG. 5 is a top view of the flow redirector of FIG. 4 in use.

FIG. 5 depicts a top view of the first redirector configuration 400 of FIG. 4 in use. The first redirector configuration 400 redirects the incoming water flow 200 and forms the redirected flow 310. In this configuration, the redirected flow 310 forms a first angle 500 with the water flow 200. The first angle 500 is sufficiently large, such that the redirected flow 310 does not return towards the source of the water flow 200. The first redirector configuration 400 also increases the spray angle of the redirected flow 310 when compared to the water flow 200.

Figure 6:
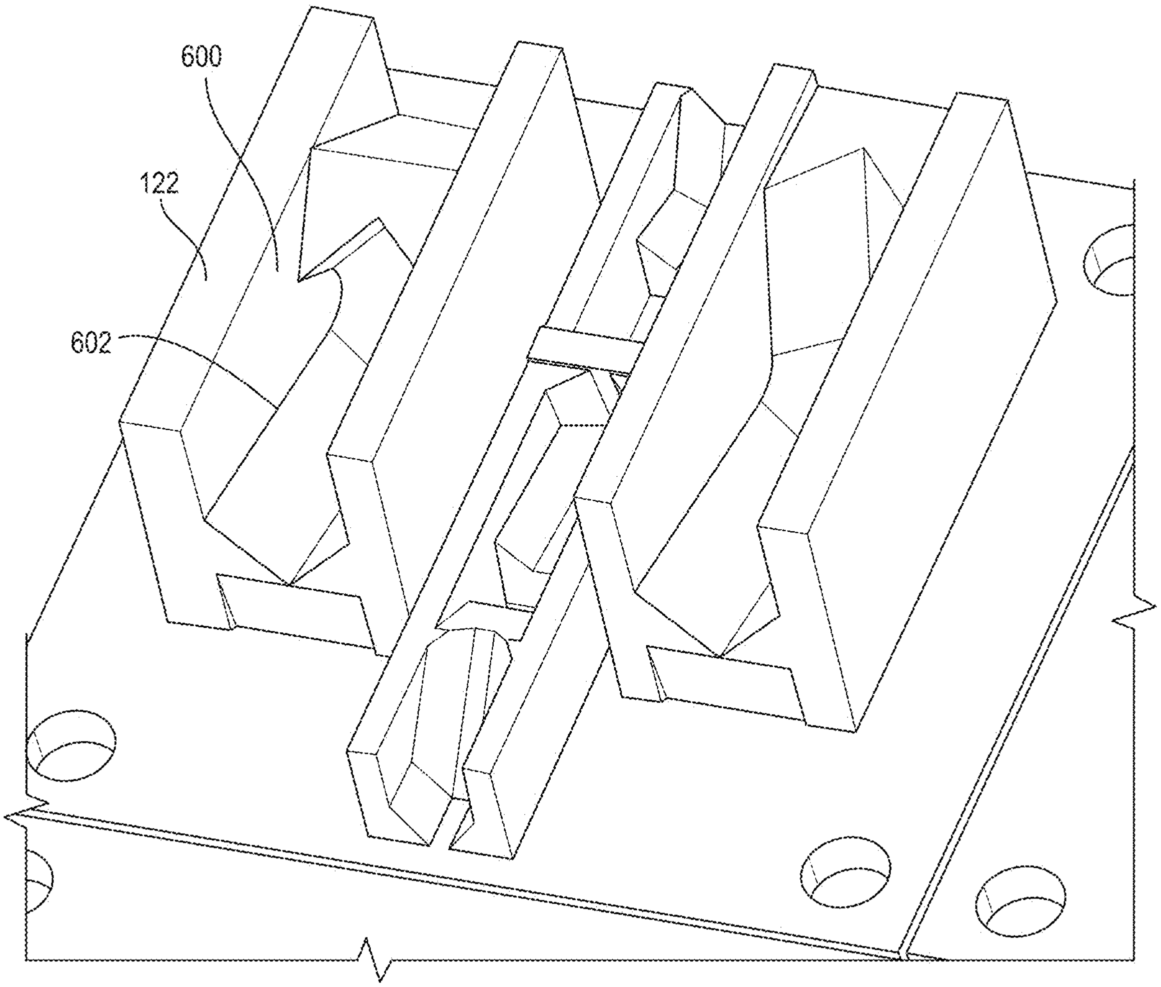
FIG. 6 is a flow redirector, according to another exemplary embodiment.

FIG. 6 depicts a flow redirector 122 in a second redirector configuration 600, according to a particular embodiment. The second redirector configuration 600 redirects incoming water flow 200 along a second internal channel 602. The second internal channel 602 directs the incoming water flow back toward the source of the incoming water flow 200. As depicted in FIG. 6, the second internal channel 602 can be at least partially angled (e.g., arcuate, bent, etc.).

Figure 7:
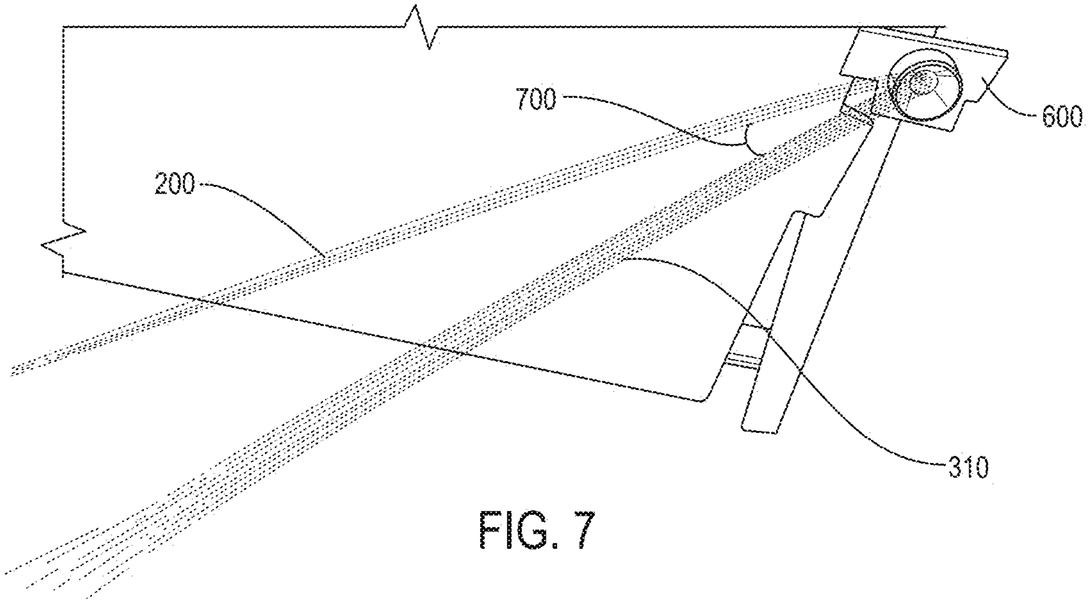
FIG. 7 is a is a top view of the flow redirector of FIG. 6 in use.

FIG. 7 depicts a top view of the second redirector configuration 600 of FIG. 6 in use. The second redirector configuration 600 redirects the incoming water flow 200 and forms the redirected flow 310. In this configuration, the redirected flow 310 forms a second angle 700 with the water flow 200. The second angle 700 is sufficiently small, such that the redirected flow 310 return towards the source of the water flow 200. The second redirector configuration 600 also increases the spray angle of the redirected flow 310 when compared to the water flow 200.

Figure 8:
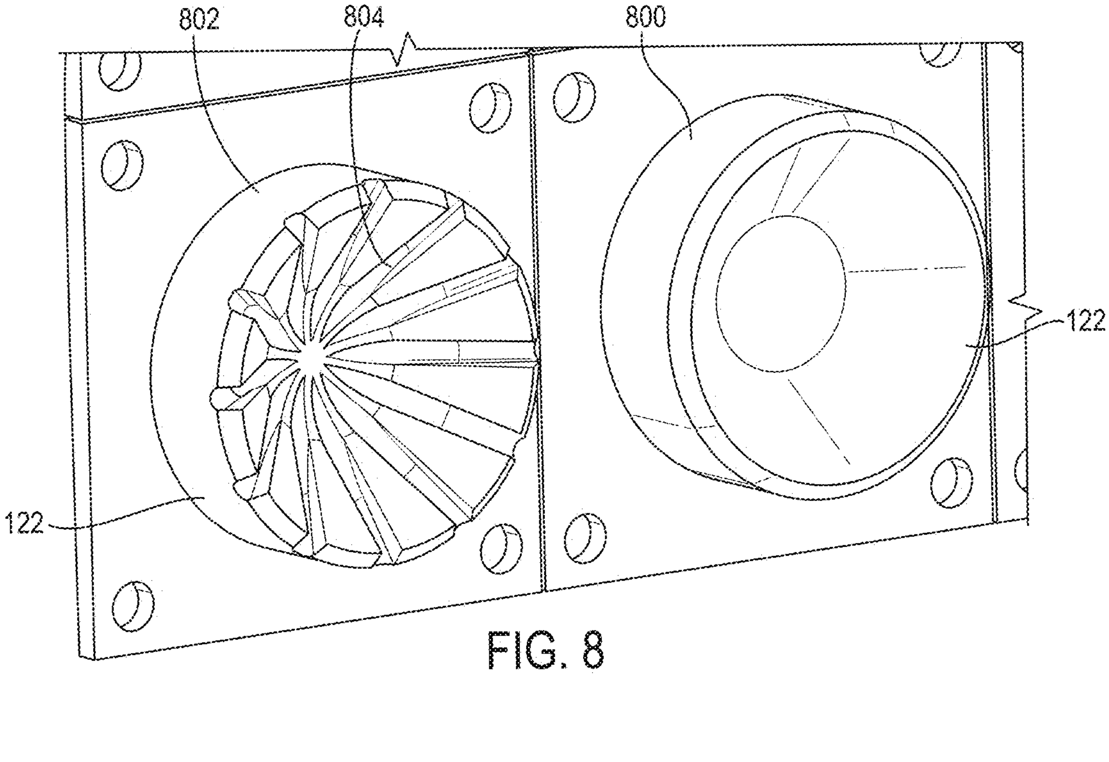
FIG. 8 is a flow redirector, according to another exemplary embodiment.

FIG. 8 depicts a flow redirector 122 in a third redirector configuration 800 and a fourth redirector configuration 802, according to a particular embodiment. The third redirector configuration redirects incoming water flow 200 and fans the water flow out and away from the third redirector configuration 800. The fourth redirector configuration 802 includes additional flow channels 804. The flow channels 804 redirect the incoming water flow 200 towards specific directions. As depicted in FIG. 8, the flow channels 804 can be at least partially angled (e.g., arcuate, bent, etc.).

Figure 9:
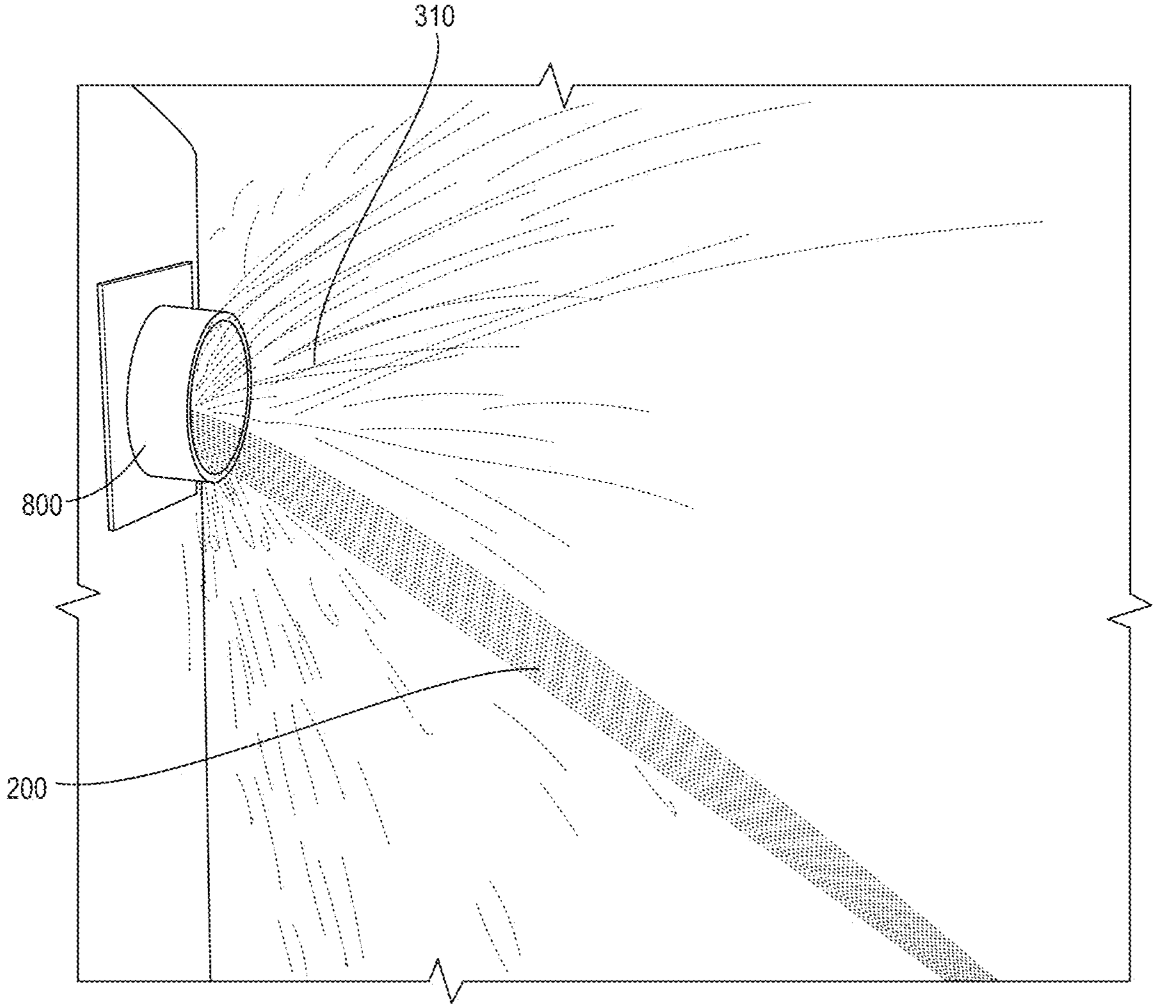
FIG. 9 is a perspective view of the flow redirector of FIG. 8 in use.

FIG. 9 depicts a perspective view of the third redirector configuration 800 of FIG. 8 in use. The third redirector configuration 800 conditions the incoming water flow 200 and forms the redirected flow 310. In this configuration, the redirected flow 310 has a large (e.g., greater than 30 degrees) spray angle. Additional embodiments of the flow redirector 122 may condition the water flow 200 to be in different directions and may change other attributes of the water flow 200.

Figure 10:
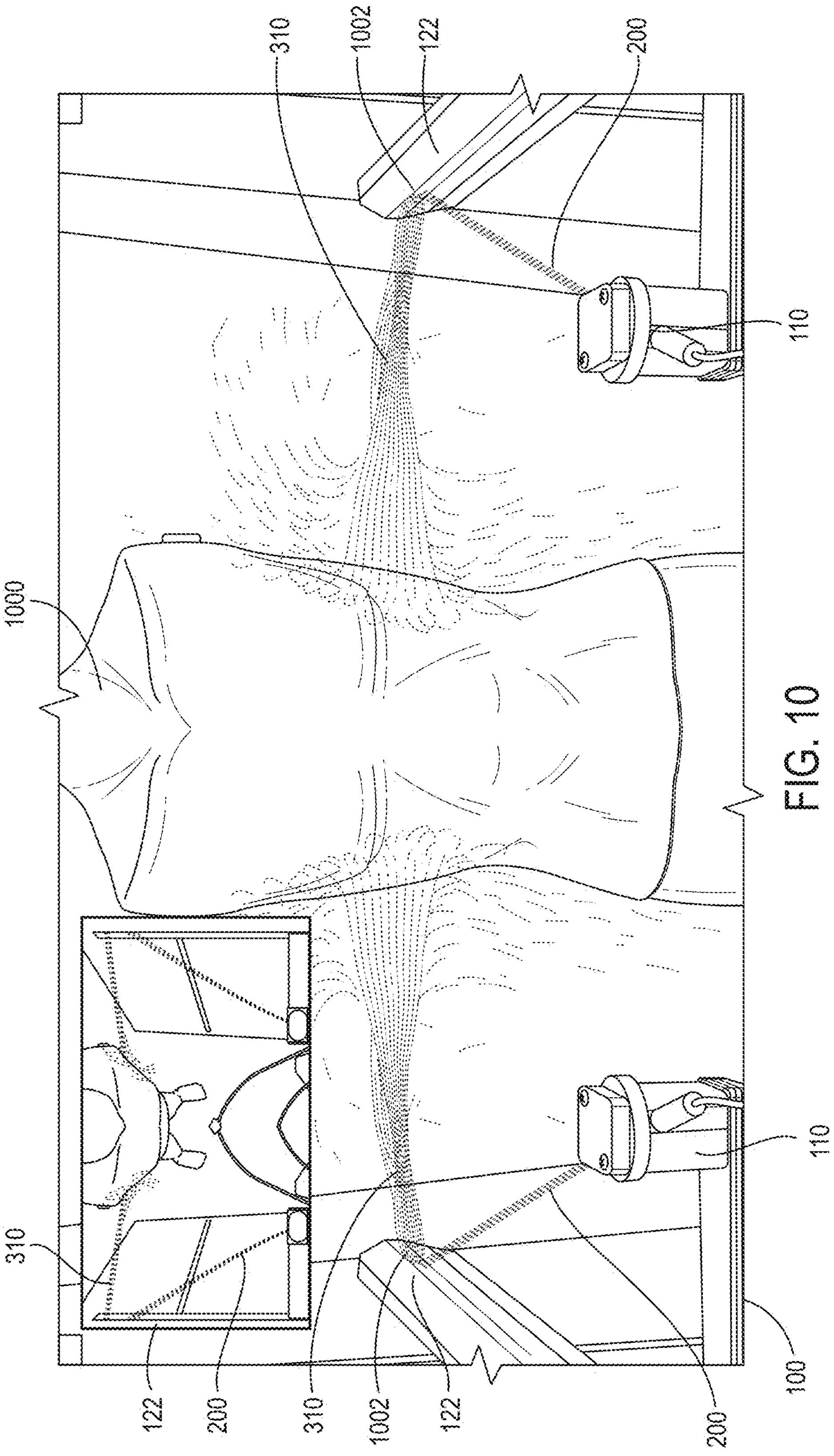
FIG. 10 is a perspective view of flow redirector in use, according to an exemplary embodiment.
Figure 11:
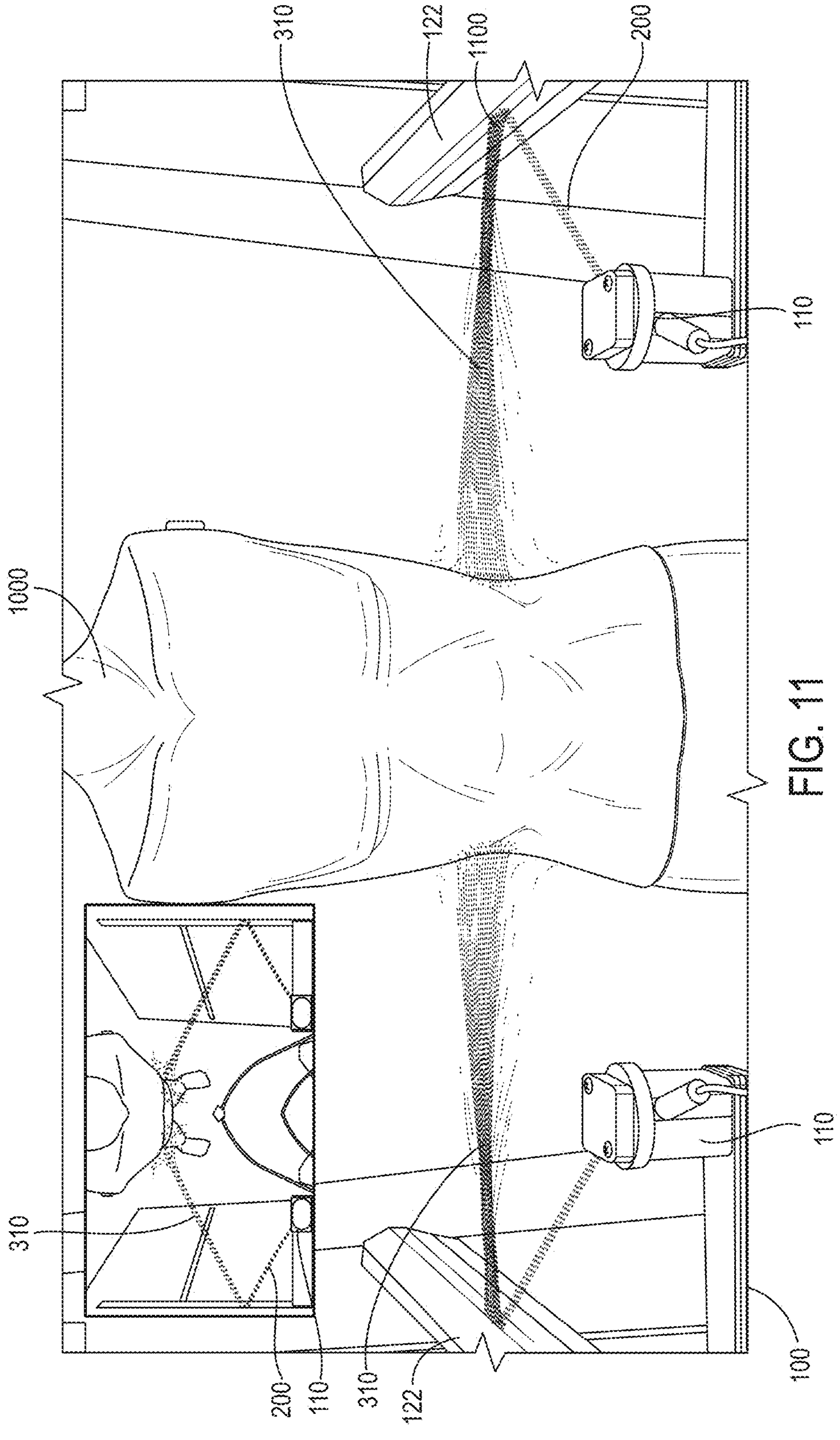
FIG. 11 is a is a perspective view of a flow director of FIG. 10 in use, according to another exemplary embodiment.

Referring generally to FIGS. 10-11, a shower system 100 is depicted being tested on a user model 1000, according to exemplary embodiments. The user model 1000 is intended to represent the torso of a human. The flow redirectors 122 included in these embodiments is configured with multiple locations for redirecting flow, such that a nozzle 110 may be reoriented to a different portion of the flow redirector 122 to produce redirected flow 310 having different characteristics.

FIG. 10 depicts a front view and a top view of a shower system 100 being tested on a user model 1000, according to an exemplary embodiment. The nozzles 110 are configured to direct a water flow 200 towards a first position 1002 of the flow redirectors 122. The resulting redirected flow 310 contacts the rear of the user model 1000.

FIG. 11 depicts a front view and top view of a shower system 100 of FIG. 10, according to another exemplary embodiment. In this embodiment, the nozzles 110 are configured to direct the water flow 200 towards a second position 1100 of the flow redirectors 122. The resulting redirected flow 310 contact the front of the user model 1000. In some embodiments, the flow redirector 122 may be configured to produce redirected flow 310 that is directed at different portions of the user model 1000.

Figure 12:
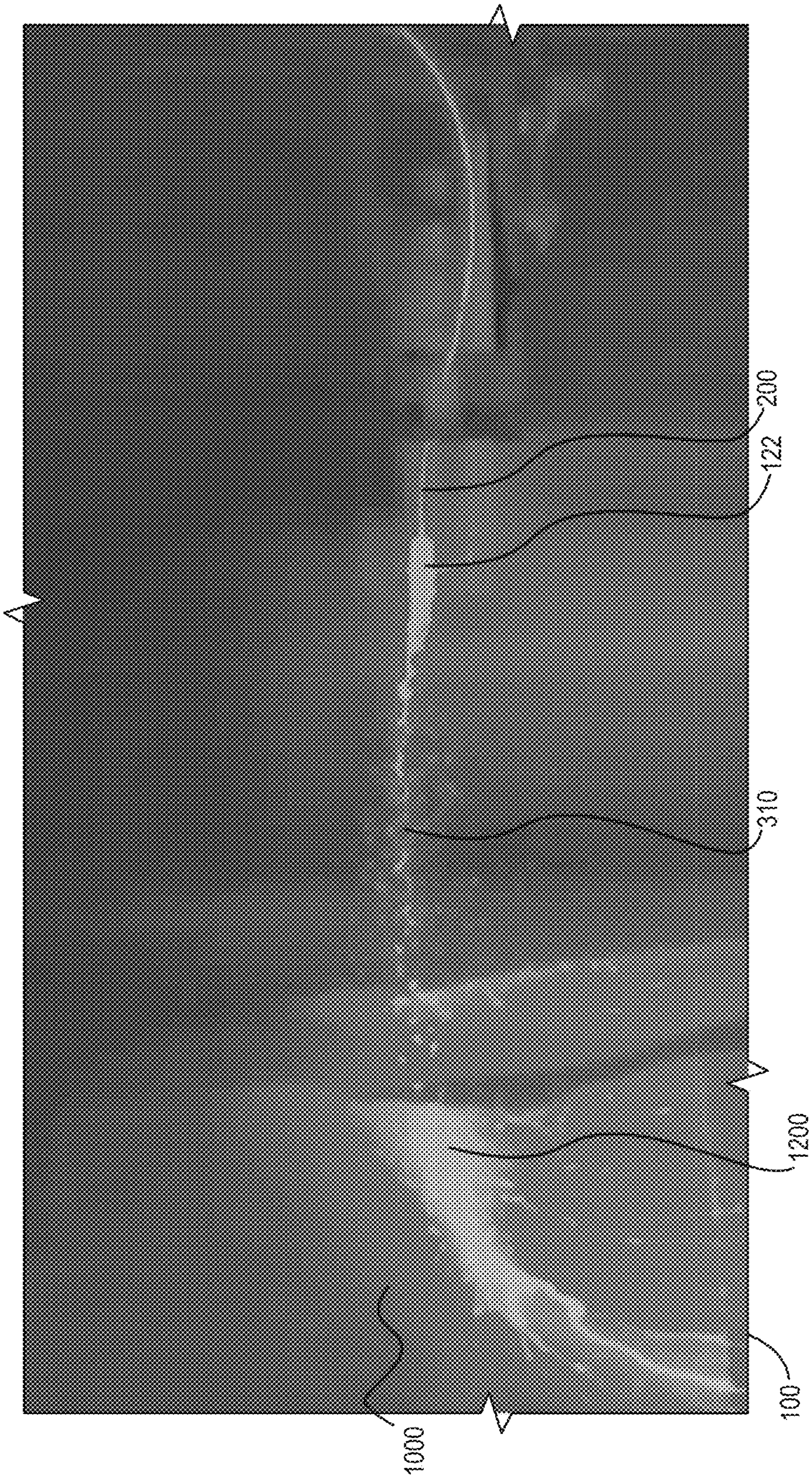
FIG. 12 is a thermal view of a flow redirector in use, according to an exemplary embodiment.

FIG. 12 depicts a thermal (e.g., as produced by a thermal camera) view of a shower system 100 in use. A water flow 200 is redirected by a flow redirector 122 and the resulting redirected flow 310 contacts a user model 1000 at splash zone 1200. The splash zone 1200 registers the same thermal reading as the flow redirector 122 and the water flow 200. This demonstrates that there is minimal heat loss during the redirection process. In some embodiments, use of the shower system 100 may include a preheating step that warms up the flow redirector 122. Preheating may be by a heating device (e.g., heating element) or may be by flowing heated water against the flow redirector 122 until it reaches its target temperature.

Referring generally to FIGS. 13-17, a shower system 100 is depicted, according to exemplary embodiments. The shower system 100 includes a showerhead 104 mounted on a front wall within a bathing environment. The walls and ceiling of the bathing environment, in these embodiments, are covered with a plurality of identical flow redirectors 122. In some embodiments, the flow redirectors 122 may be of various configurations. These embodiments also feature lights intended to highlight the water flow 200 and the redirected flow 310.

Figure 13:
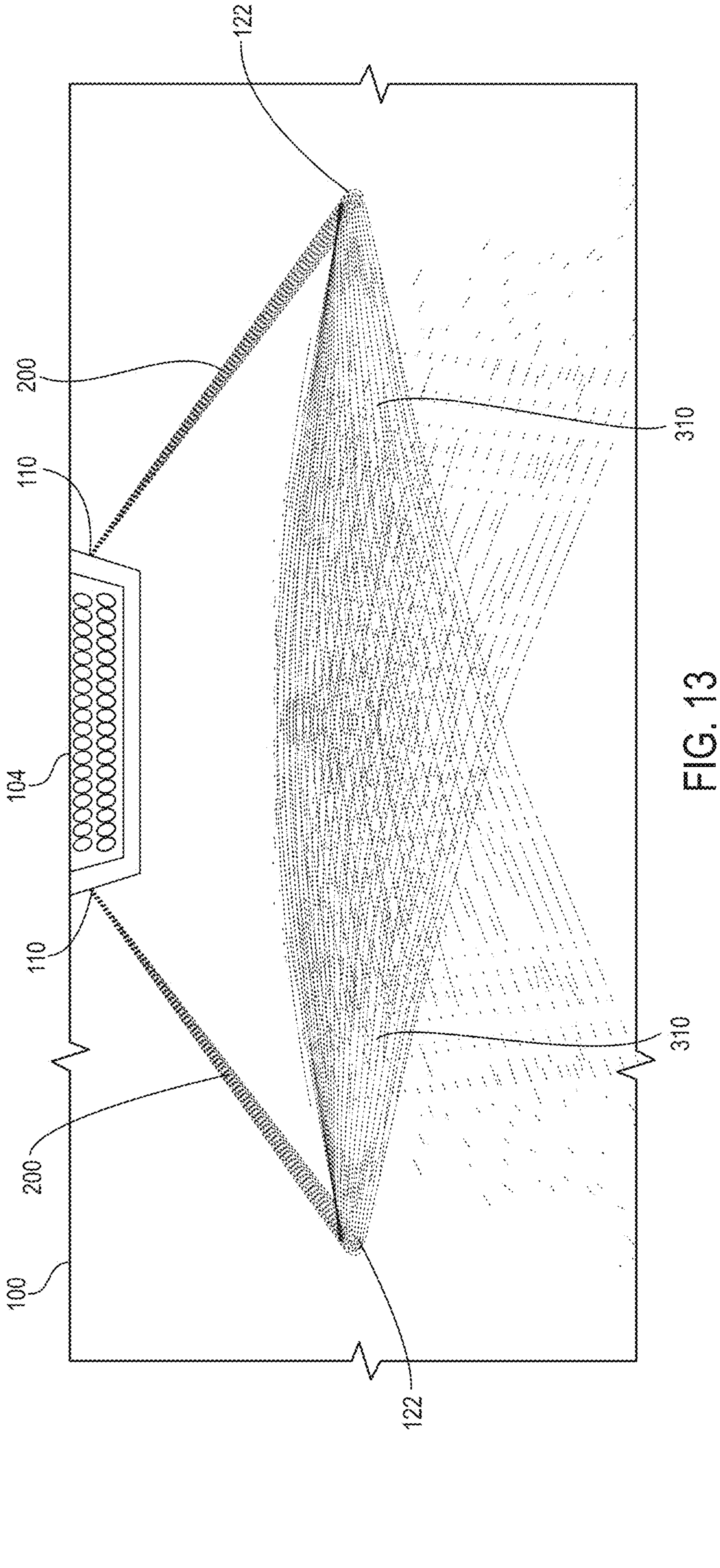
FIG. 13 is a top view of a shower system, according to an exemplary embodiment.

FIG. 13 depicts a top view of the shower system 100, according to an exemplary embodiment. As shown in FIG. 13, the nozzles 110 may be separated by a distance and may be substantially coplanar (e.g., on the showerhead 104). The showerhead 104 directs water flow 200 from nozzles 110 towards flow redirectors 122 mounted on the wall of the bathing environment. After being redirected by the flow redirectors 122, the redirected flow 310 travels perpendicular and away from the wall.

Figure 14:
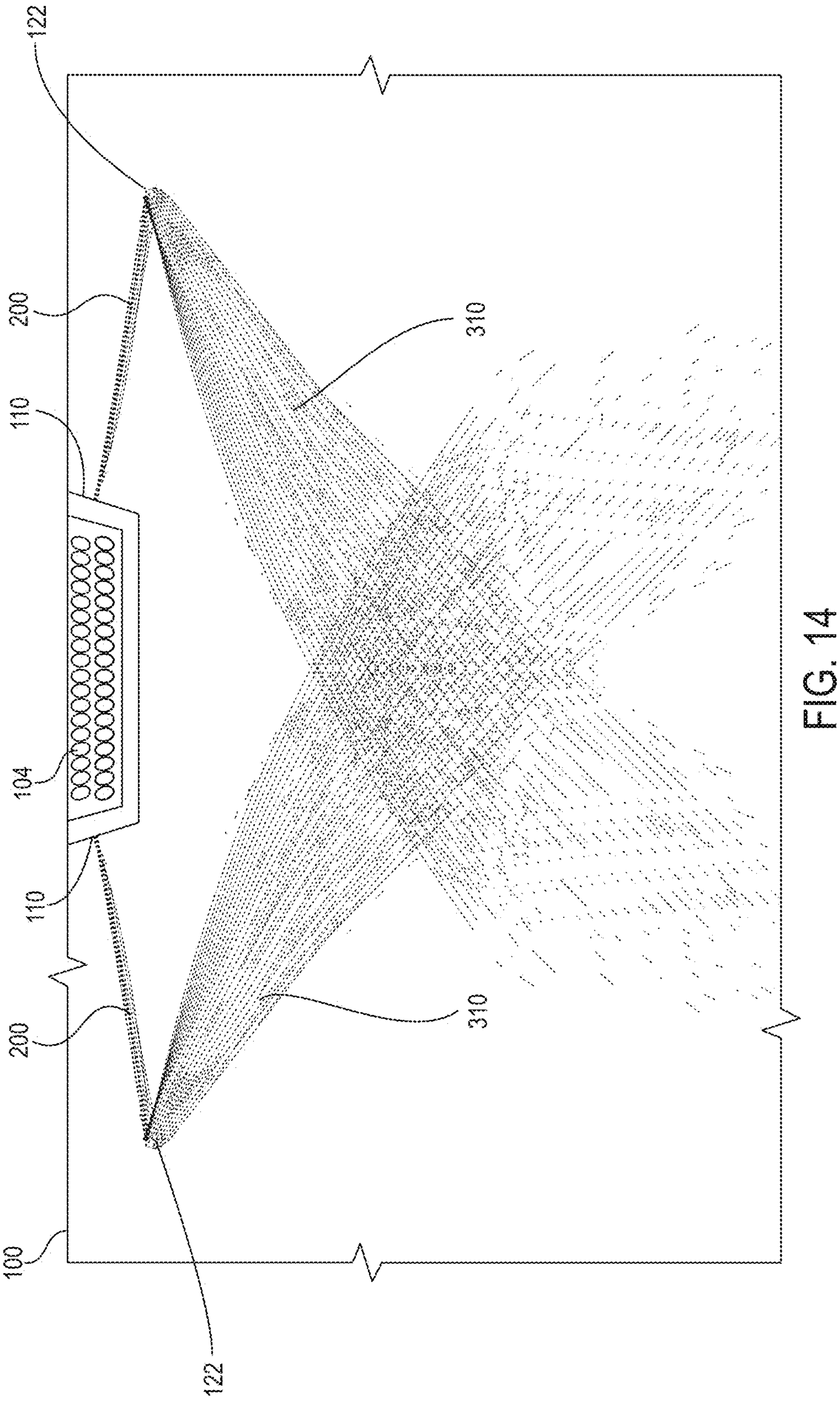
FIG. 14 is a top view of the shower system of FIG. 13, according to another exemplary embodiment.

FIG. 14 depicts a top view of the shower system 100 of FIG. 13, according to another exemplary embodiment. The showerhead 104 directs water flow 200 from nozzles 110 towards flow redirectors 122 mounted on the walls of the bathing environment. After being redirected by the flow redirectors 122, the redirected flow 310 travels at an angle away from the front wall and towards the center of the bathing environment and at least partially crosses streams.

Figure 15:
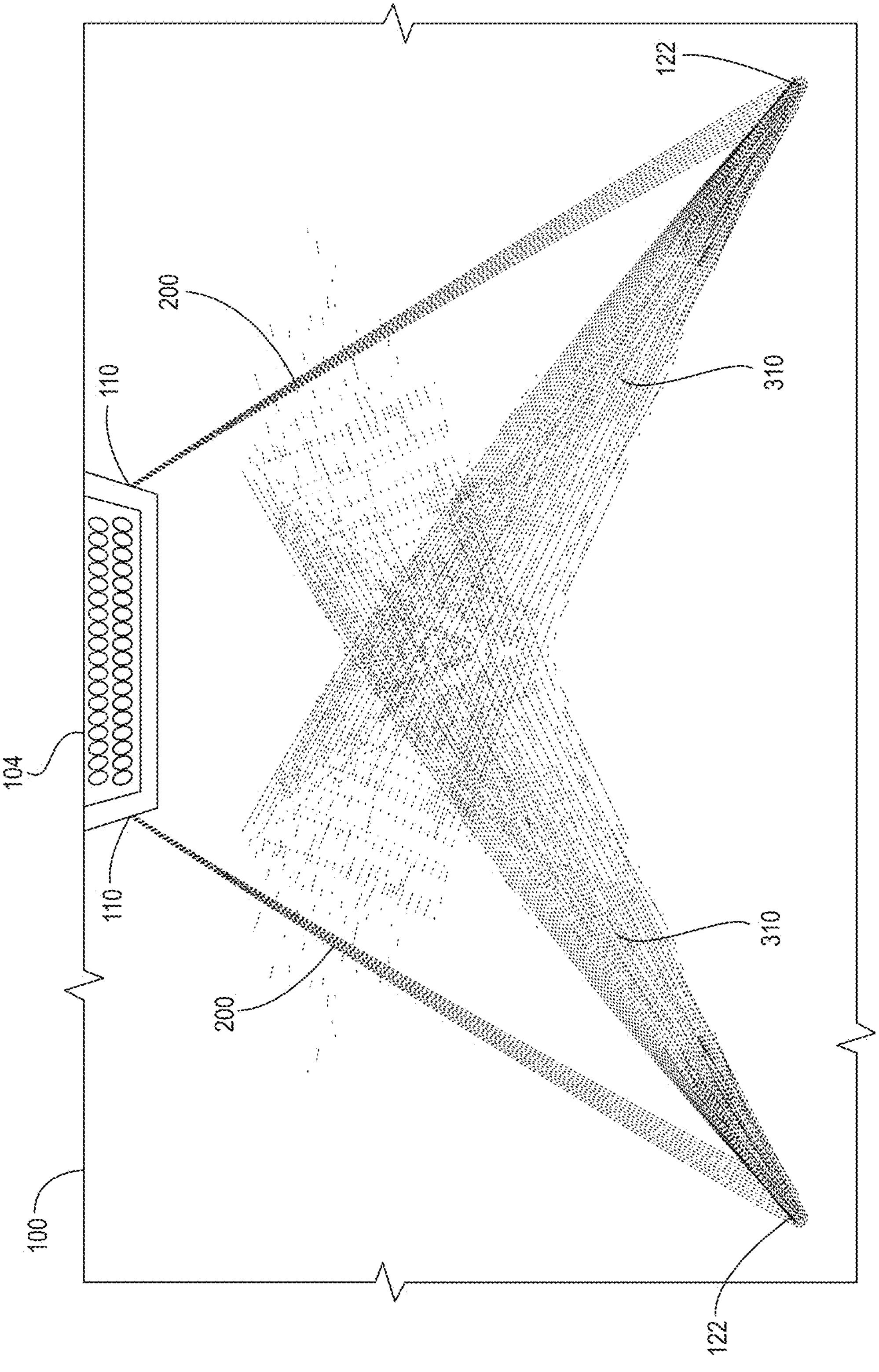
FIG. 15 is a top view of the shower system of FIG. 13. according to another exemplary embodiment.

FIG. 15 depicts a top view of the shower system 100 of FIG. 13, according to another exemplary embodiment. The showerhead 104 direct water flow 200 from nozzles 110 towards flow redirectors 122 mounted on the walls of the bathing environment. After being redirected by the flow redirectors 122, located at the rear of the bathing environment, the redirected flow 310 travels back towards the center of the bathing environment and in the direction of the showerhead 104 and at least partially crosses streams.

Figure 16:
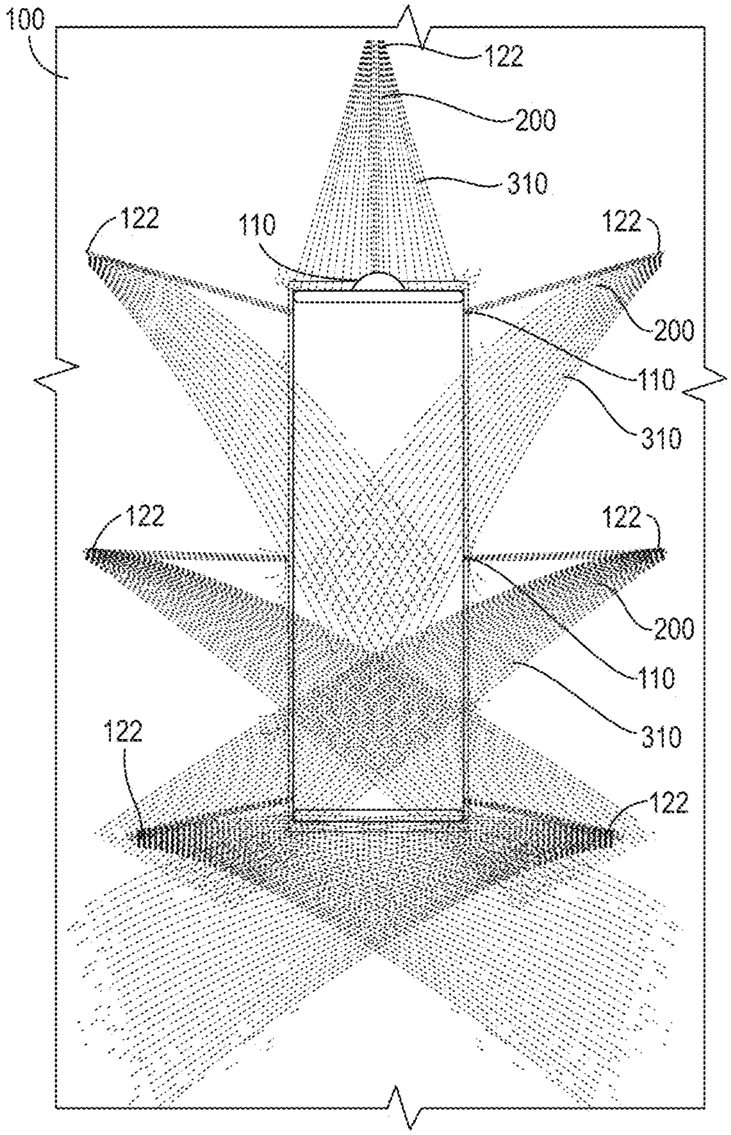
FIG. 16 is a front view of the shower system of FIG. 13, according to an exemplary embodiment.

FIG. 16 depicts a front view of the shower system 100 of FIG. 13, according to another exemplary embodiment. The showerhead 104 directs water flow 200 from nozzles 110 to the flow redirectors 122 mounted on the walls and ceiling of the bathing environment. In this embodiment, the flow redirectors 122 redirect the water flow 200 such that the resulting redirected flow 310 travels down and towards the vertical center of the bathing environment.

Figure 17:
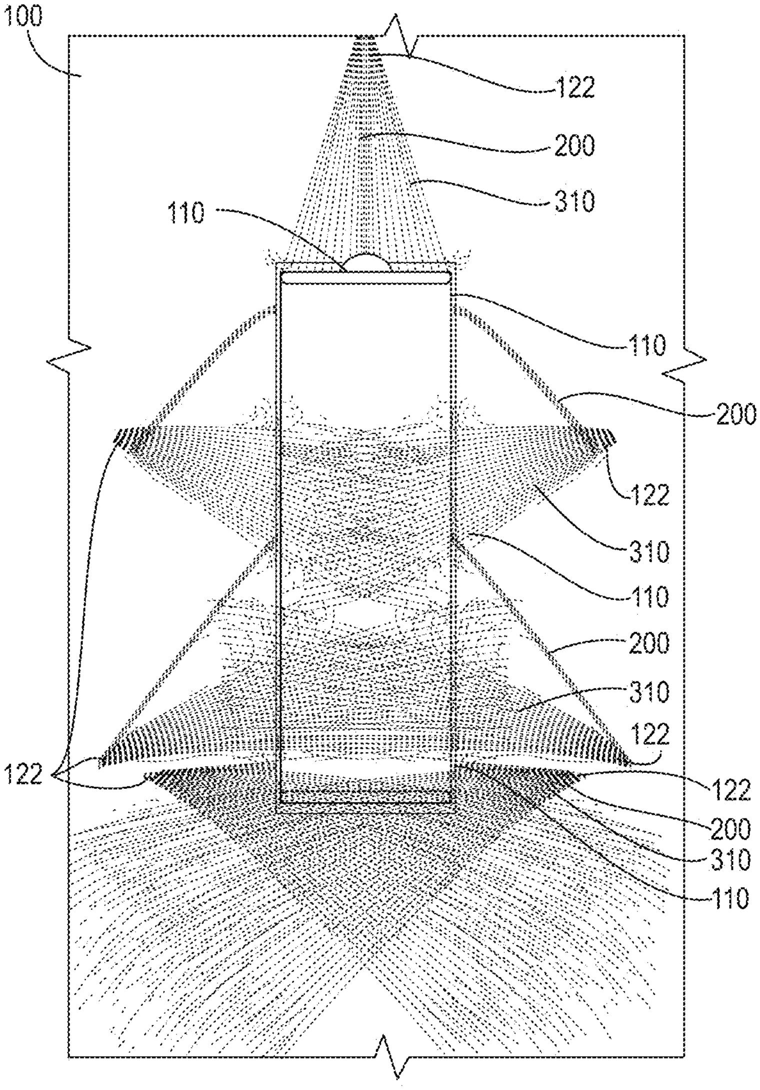
FIG. 17 is a front view of the shower system of FIG. 13, according to another exemplary embodiment.

FIG. 17 depicts a front view of the shower system 100 of FIG. 13, according to another exemplary embodiment. The showerhead 104 directs water flow 200 from nozzles 110 on the flow redirectors 122 mounted on the walls and ceiling of the bathing environment. In this embodiment, the flow redirectors 122 redirect the water flow 200 in various directions, while maintaining symmetry vertically.

Figure 18A:
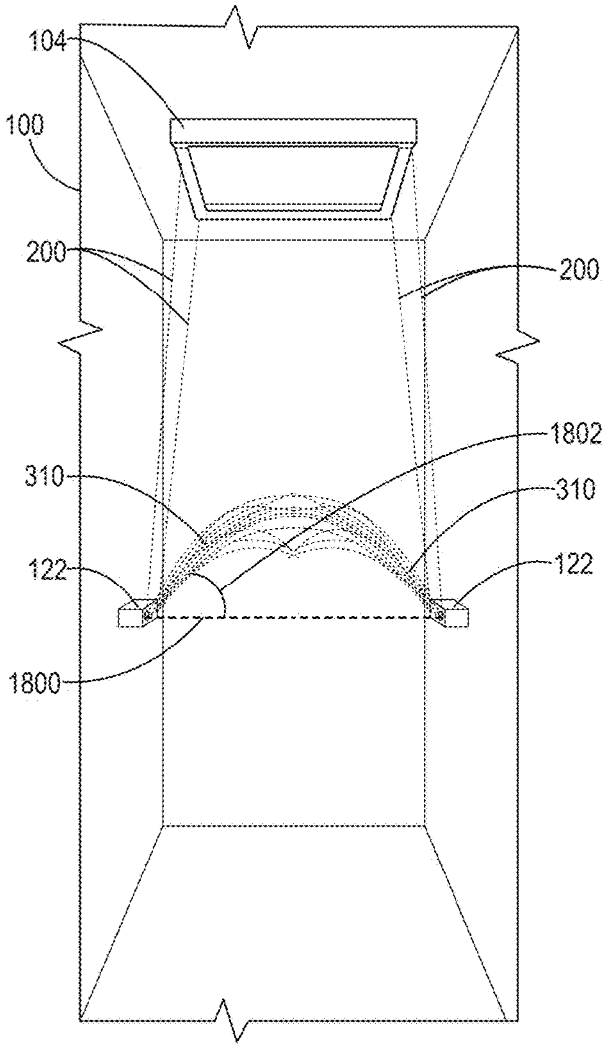
FIG. 18A-B are front view of a shower system, according to exemplary embodiments.
Figure 18B:
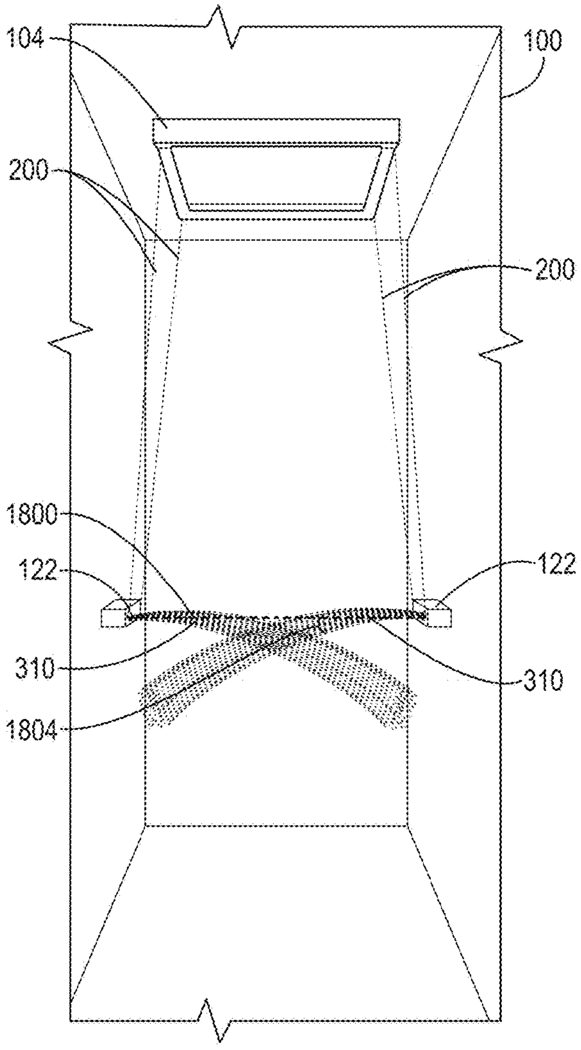

Referring generally to FIGS. 18A-18B, a shower system 100 in a bathing environment is shown, according to a particular environment. The shower system 100 includes a showerhead 104 configured to direct water flow 200 towards flow redirectors 122, mounted on the walls of the bathing environment. The flow redirectors 122 include multiple positions, each producing a differently angled redirected flow 310 related to a horizon line 1800. The nozzles 110 in showerhead 104 are repositionable such that the water flow 200 may be directed towards the multiple positions. In some embodiments, the flow redirectors 122 may include mechanical components configured to change how the flow redirectors 122 redirect the water flow 200.

FIG. 18A depicts the shower system 100, according to an example embodiment. The redirected flow 310 flows up and towards the horizontal center of the bathing system, forming a positive angle 1802 with the horizon line 1800 when measured counter-clockwise.

FIG. 18B depicts the shower system 100 of FIG. 18A, according to another exemplary embodiment. The redirected flow 310 flows down and towards the horizontal center of the bathing system, forming a negative angle 1804 with the horizon line 1800 when measured counter-clockwise.

Figure 19:
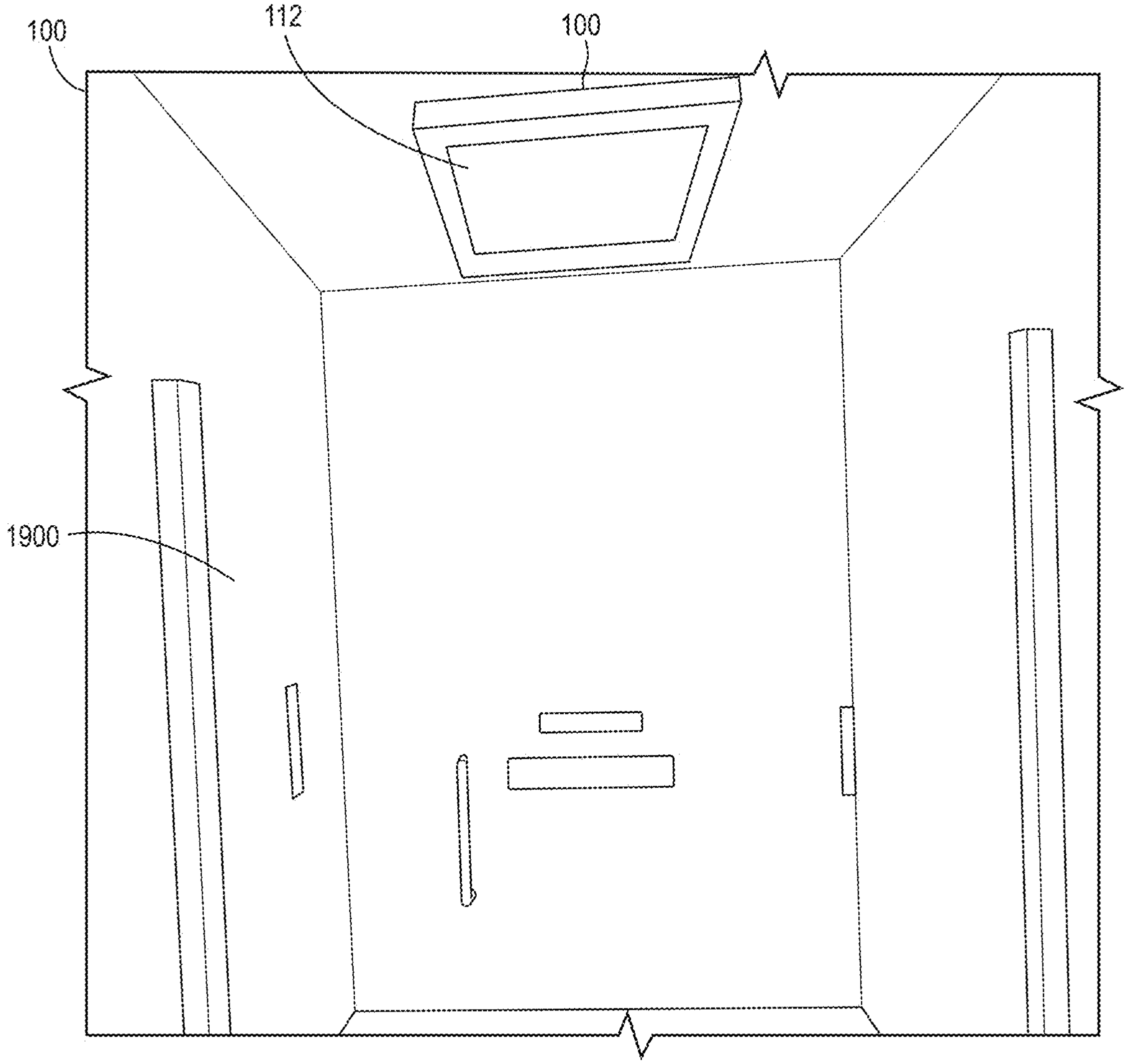
FIG. 19 is a front view of a shower system, according to an exemplary embodiment.

FIG. 19 depicts a front view of a shower system 100, according to another exemplary embodiment. The shower system 100 includes a shower head 104 including a light panel 112. The light panel 112 includes a black light (e.g., long-wave ultraviolet light) and an indicator 1900. The indicator 1900 is made from a material that laminated (e.g., lights up) when exposed to a black light. The indicator 1900 may include information useful to a user. For example, the indicator 1900 may indicate that the water within the shower system 100 has reached a target temperature. The light panel 112 is configured to turn on only when the information included in indicator 1900 is correct (e.g., true).

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or movable (e.g., removable or releasable). Such joining may be achieved with the two members coupled direction to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include on or more devices (e.g., RAM, ROM, Flash memory, hard disk storage) for storing data and/or computer code for completing or facilitating the various processes, layer and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structure and which can be accessed by a general purpose or special purpose computer or other machine with a processor. Combinations of the above are also included in the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of system as shown in the various exemplary embodiments is illustrative only. Additionally, any element disclosed in one embodiment may be incorporated or utilized with any other embodiment disclosed herein. For example, the system of the exemplary embodiment described with reference to FIGS. 2-3D and 18A-18B may be incorporated in the system of the exemplary embodiment described with reference to FIGS. 4-17. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A shower system, comprising:

a showerhead mounted on a ceiling and having a rectangular shape, the showerhead comprising a plurality of nozzles including a first nozzle, a second nozzle, a third nozzle, and a fourth nozzle, wherein each nozzle is positioned at a respective corner of the showerhead and each nozzle is configured to dispense a stream of water through airspace in a downward direction; and a plurality of flow redirectors disposed beneath the showerhead and each configured to receive a respective stream of water from a respective nozzle of the plurality of nozzles through the airspace and rebound the stream of water to redirect the stream of water in a direction substantially perpendicular to the downward direction.

2. The shower system of claim 1, wherein at least one flow redirector of the plurality of flow redirectors comprises at least one angled water channel configured to receive and redirect the stream of water.

3. The shower system of claim 1, wherein:

a first flow redirector of the plurality of flow redirectors and a second flow redirector of the plurality of flow redirectors are configured to cause a first stream of water and a second stream of water to at least partially cross streams in the airspace.

4. The shower system of claim 3, wherein the first nozzle and the second nozzle are separated and coplanar.

5. The shower system of claim 1, wherein the first nozzle is configured to dispense the stream of water in a substantially linear stream and a first flow redirector of the plurality of flow redirectors is configured to cause the stream of water to at least partially diverge from the substantially linear stream.

6. The shower system of claim 1, further comprising:

an entertainment system having a light, a speaker system, and a controller operably coupled to the first nozzle;

wherein the controller is configured to synchronize the stream of water from the first nozzle, the light, and the speaker system.

7. The shower system of claim 6, wherein the controller is configured to control the stream of water from the first nozzle via one or more valves operably coupled to the first nozzle.

8. The shower system of claim 1, wherein:

the first nozzle is fixed such that the downward direction is constant; and a first flow redirector of the plurality of flow redirectors is fixed.

9. The shower system of claim 1, wherein the first nozzle is movable and configured to adjust the direction of the stream of water by moving the first nozzle.

10. The shower system of claim 1, wherein a first flow redirector of the plurality of flow redirectors is movable and configured to adjust the direction of the rebounded stream of water by moving the first flow redirector.

* * * * *